Patented July 28, 1953

2,647,061

UNITED STATES PATENT OFFICE 2,647,061

ARTICLES OF CALCIUM-CARBON BORIDE

Edwin C. Lowe, Niagara Falls, Ontario, Canada, assignor to Norton Company, Worcester, Mass., a corporation of Massachusetts No Drawing. Application June 21, 1951,
Serial No. 232,865

2 Claims. (Cl. 106—43)

The invention relates to articles of calcium-carbon boride.

One object of the invention is to provide tools, gauges, and other articles which are exceedingly hard and at the same time have adequate strength. Another object of the invention is to manufacture pieces having substantially or nearly the hardness of boron carbide yet possessing considerably more strength. Another object of the invention is to provide a hard, tough substance made out of elements which are not scarce in North America. Another object of the invention is to provide superior jet nozzles and turbine blades and many other useful articles such as impeller blades for handling grit and abrasive, sand blast nozzles, wire drawing dies, mold liners, cylinder liners and anything which should be extremely hard but which ought to be stronger than boron carbide, $B_4C$. Another object of the invention is to provide articles of the composition indicated of low density.

Other objects will be in part obvious or in part pointed out hereinafter.

In order to make a mixed carbon and calcium boride I can procure some carbon boride, $CB_4$, which is readily available, and I can make some calcium boride, $CaB_6$, grind each of these borides very fine, mix them and then mold pieces from the mixture in a pressure molding furnace such as that disclosed in U. S. Letters Patent No. 2,125,588 to R. R. Ridgway, granted July 5, 1938. I can make calcium boride $CaB_6$ by heating lime and boric oxide, $B_2O_3$, and carbon to a temperature which is the melting point of the lime, CaO, in the presence of the boric oxide in the mixture, which temperature will be at least 2400° C., and this reaction should be carried out in a reducing atmosphere. I can use a number of different furnaces, for example I can use the arc furnace of patent to Aldus C. Higgins No. 775,654 granted April 4, 1904, or I can use the furnace of Reissue Patent 13,027 dated October 26, 1909, also granted to Aldus C. Higgins. These furnaces are now known as Higgins furnaces and are in operation in many electric furnace plants and are well known. By keeping a heavy cover of mixture on the molten pool in the furnace a reducing atmosphere is maintained since the reaction liberates carbon monoxide.

I can also make the calcium boride in the closed resistance furnace described in U. S. Letters Patent No. 2,123,158 to R. R. Ridgway granted July 5, 1938. Furthermore I can synthesize the calcium boride in the pressure molding tube furnace of the aforesaid U. S. Letters Patent No. 2,125,588. The calcium boride can likewise be made in the open resistor furnace of the type used for making silicon carbide which is so well known no further description is required.

Carbon boride can be made according to U. S. Letters Patent No. 1,897,214 to the same R. R. Ridgway dated February 14, 1933.

The equation for the manufacture of calcium boride, $CaB_6$, is shown in the following table.

Table I

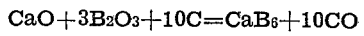
$$CaO + 3B_2O_3 + 10C = CaB_6 + 10CO$$

I can, of course, make this mixed carbon and calcium boride out of readily available carbon boride and out of calcium boride, $CaB_6$, now available on the market regardless of how it was made.

Continuing, however, with the process of manufacturing calcium boride according to the reaction of Table I since this produces a very good grade of calcium boride, it will be seen that carbon monoxide is liberated in large quantities. This insures a reducing atmosphere if proper precautions are taken in charging the furnaces. For example if the arc furnace is used, a comparatively deep furnace should be selected and a good cover of mixture should be maintained on the molten pool as already stated. These arc furnaces automatically raise the mixture to the melting point but do not overheat it because of the automatic regulators which operate to raise the electrodes when the current density becomes too high. Such automatic regulating mechanism is well known and in use in many plants in the United States and Canada so I need not describe it. The closed resistance furnace of Patent 2,123,158 and the tube furnace of Patent 2,125,588 are constructed so that they will keep a reducing atmosphere around the mixture being reacted where, as in this case, carbon monoxide is being liberated. If the open resistor furnace is used the reaction charge should be packed around the resistor in the same manner that the coke and silica sand are packed around the resistor for the manufacture of silicon carbide. Sawdust can be added in the same proportions as in the case of the manufacture of silicon carbide in such open resistor furnaces. Furthermore in any case it is desirable to add enough kerosene to the mixture to make it damp.

Accordingly having disclosed several ways in which calcium boride may be manufactured and having explained these ways sufficiently for those skilled in this art to make the same I need not further particularize upon the manufacture of calcium boride especially as it is available on the market being probably made in other manners with which I am not familiar. As aforesaid carbon boride $CB_4$ is now a well known material and many tons of it a year have been made for a good many years past. This material generally passes under the name boron carbide and the formula is usually written $B_4C$ but the material is equally a boride and a carbide and it makes no difference which element is mentioned first.

For the manufacture of molded pieces of mixed borides of carbon and calcium a mixture of the powders of the two borides can be used. The mixture should be a thorough mixture and in fact the better the mixture the better the pieces and any expedient resorted to in order to produce a better mixture is warranted. Molding powder which I have used for the manufacture of very high grade pieces of the mixed boride had a fineness as in the following table.

*Table II*

| Range of Particle Size in Microns | Weight Percentage |
|---|---|
| 1 to 2 | 10 |
| 2 to 3 | 10 |
| 3 to 5 | 25 |
| 5 to 8 | 45 |
| 8 to 11 | 5 |
| 11 to 15 | 5 |

However I can use molding powder of which 99% is at least as fine as 50 microns, 80% is at least as fine as 25 microns, and 20% is at least as fine as 15 microns.

The pieces are molded as aforesaid in a suitable pressure furnace. A very excellent furnace and one which has been used as a standard molding furnace for the molding of carbon boride is the furnace shown in Patent No. 2,125,588. A practical pressure to use is 2,500 pounds per square inch. Pieces, however, can be made at a pressure of 1,000 pounds per square inch but better pieces are made with a higher pressure. Increasing the pressure beyond 2,500 pounds per square inch is not detrimental to the pieces but may break the graphite molds which are used. Consequently standard pressure of 2,500 pounds per square inch is preferred.

The molds are made of graphite and they are filled with the powders in the above proportions which are first thoroughly mixed. Mixing should preferably be very thorough indeed. The temperature is gradually raised until the movement of the furnace plungers shows that the material has been compacted. This will occur in a range of temperature between 2000° C. and 2200° C. Control of the operation is achieved by watching the plungers after pyrometric observations have shown that the critical temperature is being approached. When the pieces have been compacted the electric current is shut off but the pressure is maintained until the pieces have cooled through a drop of at least 100° and preferably 300° C.

A thorough mixture of the powders of calcium boride and carbon boride is, no matter how thorough the mixing has been done, purely a mechanical mixture. That is to say using a microscope and very fine instruments discrete particles of the one and the other boride can be selected from the mixture. The composition of the molded pieces is also a mechanical mixture of the borides but it is a very intimate mixture. However the particles are well bonded to each other. The pieces therefore are made of a new composition of matter having superior physical properties. Powder obtained by crushing already molded masses of the borides can be used for the molding of other pieces.

Calcium boride has a density of 2.45 grams per cubic centimeter which is the same as having a specific gravity of 2.45. Carbon boride has a specific gravity of 2.5 (water=1). Specific gravities of mixed borides of various compositions are shown in the following table identified by the percentage of calcium boride, the remainder being understood to be carbon boride.

*Table III*

| Volume Percentage of Calcium Boride | Specific Gravity |
|---|---|
| 10 | 2.495 |
| 20 | 2.490 |
| 30 | 2.485 |
| 40 | 2.480 |

Articles of the invention are actually improved by the presence of some free boron. In general the less calcium boride in the articles the more free boron is needed to make the strongest pieces. With only 10% by volume $CaB_6$ (on the total $CaB_6+CB_4$) 10% free boron (on the total $CaB_6+CB_4$) gave very strong pieces. Calculated in the same way 5% free boron gave very strong pieces having 35% $CaB_6$. The 20% CaB piece of Table IV would probably have been stronger had it had less free boron. The strength of molded pieces which I have made according to this invention as compared with the strength of molded pieces made out of carbon boride $CB_4$ and out of calcium boride $CaB_6$ is shown in Table IV.

*Table IV*

| Calcium Boride, Carbon Boride and Mixed Borides of Carbon and Calcium in Volume Percentages of the $CaB_6$ and of Free Boron on the Total $CaB_6+CB_4$ | Average Cross Bending Modulus of Rupture Pounds per Square Inch |
|---|---|
| 10% $CaB_6$ 10% B+$CB_4$ | 53,000 |
| 20% $CaB_6$ 13% B+$CB_4$ | 43,000 |
| 35% $CaB_6$ 5% B+$CB_4$ | 47,000 |
| Carbon Boride | 40,000 |
| Calcium Boride | 20,000 |

Within the range of 10% by volume $CaB_6$ and 40% by volume $CaB_6$ on the total $CaB_6+CB_4$ and with up to 10% free boron and with no graphite present but permitting up to 2% by weight of free carbon in solid solution in the borides I can make pieces stronger than $CB_4$ with or without excess boron and at the same time the pieces are so nearly as hard as $CB_4$ as to be for all practical purpose of the same hardness. Consequently articles according to the invention are superior to articles made of plain boron carbide $B_4C$ for practically any purpose and this is surprising because, as shown in Table IV, calcium boride has less strength than boron carbide (carbon boride). I know of no explanation for the phenomenon. Furthermore calcium boride can be made at small expense because lime and boric acid anhydride and coke are not expensive. I am aware that Noack and Schubert in U. S. Patent No. 1,858,413 described a process for the production of calcium boride but they did not disclose articles made of $CB_4+CaB_6$ in the proportions herein set forth.

In this art the expressions carbon boride and calcium boride mean $CaB_6$ and $CB_4$ respectively with or without some free boron and with or without some carbon in solid solution and in the claims I so use these expressions. It is easy enough to obtain carbon boride $CB_4$ with free boron for it can be obtained by mere selection of materials made in accordance with Patent No. 1,897,214 in the furnace of Patent No. 2,123,158 and also by proceeding in accordance with Patent No. 2,141,617 to the same R. R. Ridgway dated December 27, 1938. Such material is readily available and in carrying out my invention I merely used $CB_4$ having the required amount of free boron which I found on hand. Furthermore by slightly varying the formula of Table I a calcium boride having free boron beyond the $CaB_6$ can readily be made. These matters will be well understood by those skilled in this art and need not be further elaborated.

It will thus be seen that there has been provided by this invention articles of manufacture in which the various objects hereinabove set forth together with many thoroughly practical advantages are successfully achieved. As various possible embodiments may be made of the above invention and as many changes might be made in the embodiments above set forth, it is to be understood that all matter hereinbefore set forth is to be interpreted as illustrative and not in a limiting sense.

I claim:

1. An article of manufacture essentially consisting of a mixture of calcium boride and carbon boride, containing $CaB_6$ and $CB_4$ with from 10% to 40% by volume $CaB_6$ on the total $CaB_6+CB_4$, with from 60% to 90% by volume $CB_4$ on the total $CaB_6+CB_4$, having not more than 10% free boron by volume having no graphite and not more than 2% by weight of carbon in solid solution in the borides, said article having been molded at a temperature of at least 2000° C. and at a pressure of at least 1000 pounds per square inch and having a modulus of rupture in cross bending of at least 43,000 pounds per square inch.

2. An article according to claim 1 having at least 5% free boron by volume on the total $CaB_6+CB_4$.

EDWIN C. LOWE.

No references cited.